United States Patent
Gu et al.

[19]

[11] Patent Number: 5,907,223
[45] Date of Patent: May 25, 1999

[54] TWO-FREQUENCY ELECTRONIC BALLAST SYSTEM HAVING AN ISOLATED PFC CONVERTER

[75] Inventors: Wen-Jian Gu, Hartsdale, N.Y.; Rui Liu, Plano, Tex.

[73] Assignee: Philips Electronics North America Corporation, New York, N.Y.

[21] Appl. No.: 08/891,879

[22] Filed: Jul. 9, 1997

Related U.S. Application Data

[63] Continuation of application No. 08/569,515, Dec. 8, 1995, abandoned.

[51] Int. Cl.$^6$ .................................................... H05B 37/02
[52] U.S. Cl. ......................... 315/247; 315/291; 315/307
[58] Field of Search ..................................... 315/307, 247, 315/219, 224, DIG. 5, DIG. 7, 209 R, 223, 174, 175

[56] References Cited

U.S. PATENT DOCUMENTS

| | | | |
|---|---|---|---|
| 3,517,300 | 6/1970 | Mc Murray | 321/60 |
| 4,412,156 | 10/1983 | Ota | 315/308 |
| 4,441,053 | 4/1984 | Daspit | 315/206 |
| 4,870,327 | 9/1989 | Jorgensen | 315/307 |
| 4,958,108 | 9/1990 | Jorgensen | 315/307 |
| 5,371,440 | 12/1994 | Liu et al. | 315/209 R |
| 5,416,387 | 5/1995 | Cuk et al. | 315/209 R |

FOREIGN PATENT DOCUMENTS

| | | |
|---|---|---|
| 0507399 | 10/1992 | European Pat. Off. . |

OTHER PUBLICATIONS

D. Chambers et al, "Dynamic Power Factor Correction in Capacitor Input Offline Converters", Powercon '79 Proceedings, pp. B3–1–B3–6, May, 1979.

C. Zhou et al, "Design Trade–Offs in Continous Current–Mode Controlled Boost Power Factor Correction Circuits", High Frequency Power Conversion Conference Record 92, pp. 202–220, May, 1992.

C. Zhou, "Design and Analysis of an Active Power Factor Correction Circuit", M.S. Thesis, Virginia Polytechnique Institute and State University, Blacksburg, Virgina, May 1990.

C.P. Henze, "A Digitally Controlled AC to AC Power Conditioner That Draws Sinusoidal Input Current", IEEE PESC '86 Record, Jun. 1986.

R. Erickson, M. Madigan and S. Singer, "Design of a Simple High Power Factor Rectifier Based on the Flyback Converter", IEEE APEC '90 Proceedings, pp. 792–801, Feb. 1990.

W. Tang, Y. Jiang, G.C. Hua and F.C. Lee, "Power Factor Correction with Flyback Converter Employing Charge Control", VPEC Seminar '92 Proceedings, Virginia Polytechnique Institute and State University, Blacksburg, Virginia, Sep. 1992.

M.H. Kheraluwala, R.L. Steigerwald and R. Gurumoorthy, "A Fast Response High Power Factor Converter with a Single Power Stage", IEEE PESC '91 Record, pp. 769–779, Jun. 1991.

(List continued on next page.)

*Primary Examiner*—Don Wong
*Assistant Examiner*—David H. Vu
*Attorney, Agent, or Firm*—Edward Blocker; Bernard Franzblau

[57] ABSTRACT

An AC-AC ballast system for a discharge lamp (e.g., a fluorescent lamp), which includes a PFC converter which incorporates an isolation transformer, and a DC-AC inverter provided on the secondary side of the isolation transformer. Because the AC line input is isolated from the lamp load by the transformer in the PFC converter, the switching frequency of the PFC converter can be advantageously significantly higher than the lamp current frequency (and the switching frequency of the DC-AC inverter), to thereby enable a significant reduction in the size and weight of the ballast system, without an increase in the emission of EMI radiation from the lamp. In this regard, the ballast system of the present invention can be thought of as a two-frequency ballast system having an isolated PFC converter.

16 Claims, 11 Drawing Sheets

OTHER PUBLICATIONS

M. Madigan, R. Erickson and E. Ismail, "Integrated High Quality Rectifier–Regulator", IEEE PESC '92, pp. 1043–1051, Jun. 1992.

W.J. Gu and K. Harada, "A Novel, Self–Excited, PWM Forward Converter with ZVS Resonant Transition Using Two Minor–Loop–Operated Saturable Cores", Record of 1992 IEEE Power Electronics Specialists Conference, pp. 85–92, Jun. 1992.

G.C. Hua, C.S. Leu and F.C. Lee, "Novel Zero–Voltage–Transition PWM Converters", Record of 1992 IEEE Power Electronics Specialists Conference, pp. 55–61, Jun. 1992.

K. Harada, H. Sakamoto, and M. Shoyama, "Phase–Controlled DC–AC Converter", IEEE Transactions on Power Electronics, vol. 3, No. 4, pp. 406–411, Oct. 1988.

B.M. Wolfframm, "Ballasts–Past, Present, and Future", Record of the 1984 IEEE Industry Application Society Annual Meeting, pp. 1288–1292, 1984.

R.J. Haver, "Electronic Ballasts", PCIM Magazine, pp. 52–56, Apr. 1986.

R. Verderber, O. Morse and F.M. Rubinstein, "Performance of Electronic Ballast and Controls With 34– and 40–Watt F40 Fluorescent Lamps", IEEE Transactions on Industry Applications, vol. 25, No. 6, pp. 1049–1059, Dec. 1989.

TWO-FREQUENCY ELECTRONIC BALLAST SYSTEM HAVING AN ISOLATED PFC CONVERTER

This is a continuation of application Ser. No. 08/569,515, filed Dec. 8, 1995, now abandoned.

BACKGROUND OF THE INVENTION

The present invention relates generally to electronic ballast systems, and, more particularly, to a novel two-frequency AC-AC electronic ballast system for a discharge lamp.

Electronic ballast lamps (EBLs) are in widespread use. In general, an EBL is a discharge lamp, e.g., a fluorescent lamp, which is coupled to an electronic ballast circuit (system) which converts an AC line voltage into a high frequency AC output voltage for operating the lamp, and which utilizes a lamp current feedback signal to regulate the sinusoidal lamp current.

Figure 1:
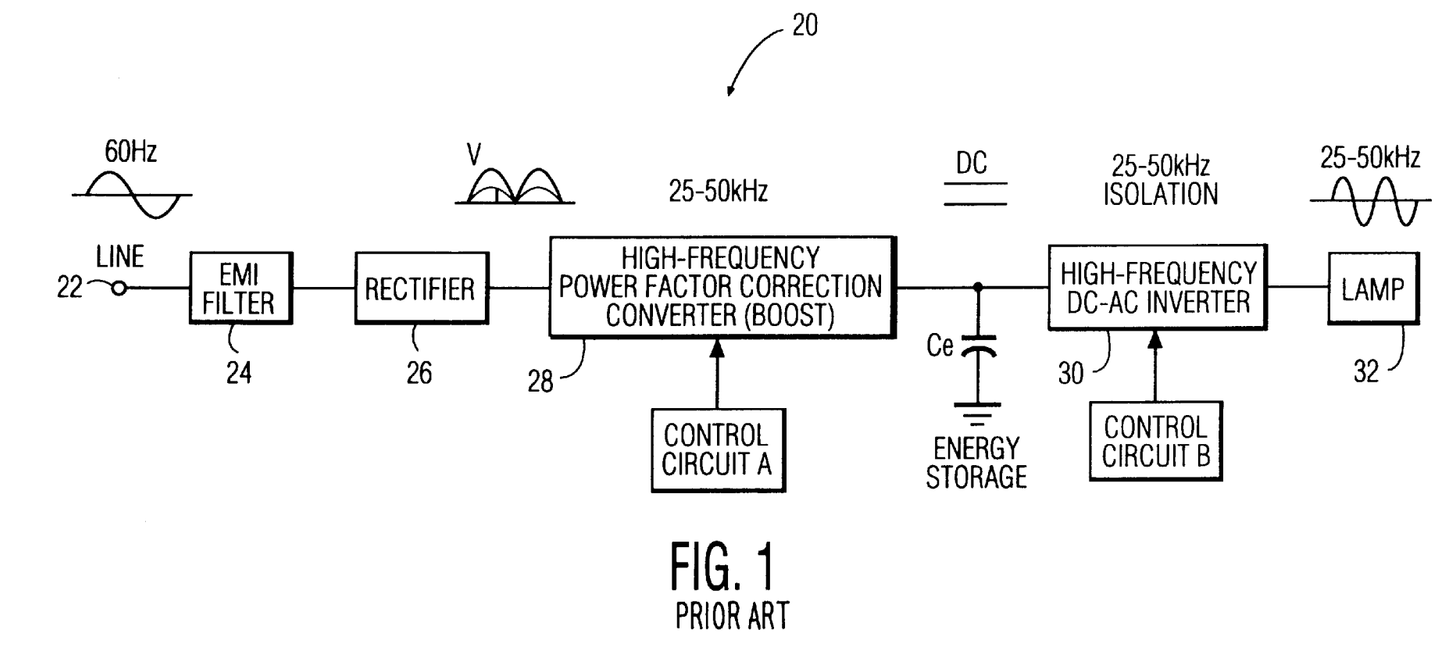
FIG. 1 is a block diagram of a conventional electronic ballast system.

With reference now to FIG. 1, there can be seen a block diagram of a conventional electronic ballast system 20 which receives its power from a utility AC line 22, e.g., from a standard 60 Hz residential outlet. The ballast system 20 includes an EMI filter 24 which filters out high-frequency noise from the ballast circuit. The AC power from the utility line is rectified by a rectifier 26, which produces a pulsating DC output. The pulsating DC output from the rectifier 26 is smoothed out by a high-frequency power factor correction (PFC) boost converter 28, which produces a smooth DC output with highly attenuated (i.e., low percent) ripple. The PFC boost converter 28 functions to hold constant at zero the phase angle between the current and voltage waveforms of the pulsating DC output from the rectifier 26, to thereby provide a near-unity power factor (pf). In general, to meet industry requirements, a gas discharge lamp ballast should draw power from the power line with a power factor of at least 90% and harmonic distortion of less than 20%. The smooth DC output from the PFC boost converter 28 is then converted by a high-frequency DC-AC inverter 30 into a high-frequency (e.g., 25–50 kHz) AC voltage which is delivered to the lamp 32 for ignition thereof. Since the input power of the system is relatively low frequency and the output power is relatively high frequency, a bulk capacitor $C_e$ is provided in the PFC boost converter 28 for energy storage, to thereby balance the input and output power. Isolation between the AC utility line input and the lamp load is provided by the inverter 30. A control circuit A is utilized to coarsely regulate the DC output from the PFC boost converter 28, and a control circuit B is utilized to control the operating frequency of the high-frequency DC-AC inverter 30, to thereby regulate the output power applied to the lamp 32.

Figure 2:
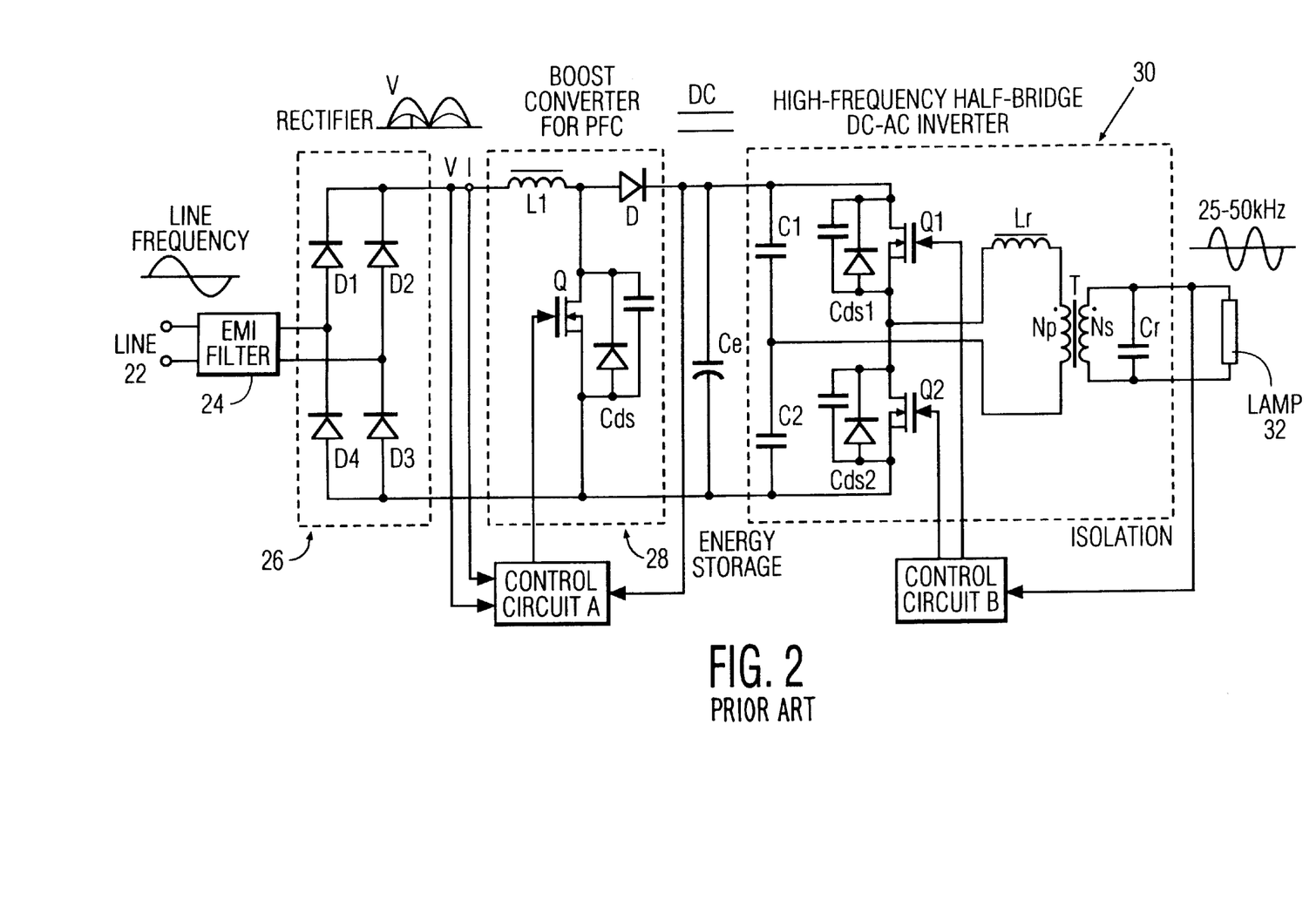
FIG. 2 is a partial schematic, partial block diagram of a typical embodiment of the conventional ballast system depicted in FIG. 1.

With reference now to FIG. 2, a typical embodiment of the conventional ballast system is depicted in partial schematic, partial block diagram form. As can be seen therein, the rectifier 26 is a full-bridge rectifier comprised of diodes D1–D4. The PFC boost converter 28 includes an inductor L1 connected in series with a forward-biased diode D, and a metal-oxide-semiconductor field-effect transistor (MOSFET) switch Q connected across the circuit. The control circuit A receives a voltage signal v and a current signal i indicative of the voltage and current values, respectively, of the pulsating DC output from the rectifier 26, at first and second inputs thereof, and receives a feedback signal from the output of the PFC boost converter 28 at a third input thereof The control circuit A functions to selectively vary the ON duty ratio and/or the switching frequency of the switch Q in order to keep the voltage and current waveforms of the pulsating DC output from the rectifier 26 in phase with one another, and thus provide appropriate power factor correction.

With continuing reference to FIG. 2, the DC-AC inverter 30 is a high-frequency half-bridge DC-AC inverter which includes a transformer T which isolates the lamp 32 from the AC line voltage. The high-frequency AC power produced by the DC-AC inverter 30 is delivered to the lamp 32 as a sinusoidal current through the L-C resonant circuit comprised of the inductor Lr and the capacitor Cr. The control circuit B receives a lamp current feedback signal and, in response thereto, controls the switching frequency of the MOSFET switches Q1 and Q2 of the DC-AC inverter 30, to thereby regulate the high-frequency AC current delivered to the lamp 32.

Since a fluorescent lamp acts as an antenna at high frequencies, the lamp current frequency is limited to about 100 kHz in order to prevent emission of excessive EMI radiation from the lamp. Typically, gas discharge lamps are operated at a frequency of 50 kHz.

The conventional ballast system described above has at least one major shortcoming. Namely, the switching frequency of the DC-AC inverter is limited by the above-stated constraint on the lamp current frequency. This limitation on the switching frequency of the DC-AC inverter requires that magnetic components (e.g, inductors and isolation transformer), and other reactive elements (e.g., capacitors) be designed for <50–100 KHz frequency, thereby imposing an unduly high lower limit on the size and weight of such components, thus unduly limiting the achievable miniaturization of the ballast system.

Representative conventional AC-AC ballast systems are disclosed in U.S. Pat. No. 5,002,400, issued to Nilssen and U.S. Pat. No. 4,564,897, issued to Okamoto. These systems suffer from the primary shortcoming discussed above. U.S. Pat. No. 4,661,897, issued to Pitel, discloses a DC-AC power conversion system which has a DC-AC inverter provided on the secondary side of an isolation transformer. Because this is a DC-AC power conversion system, it does not have a rectification stage. Further, it does not have a power factor correction converter.

Based on the above and foregoing, it can be appreciated that there presently exists a need in the art for an AC-AC electronic ballast system for a discharge lamp which overcomes the above-described major shortcoming of conventional ballast systems. In particular, there presently exists a need in the art for an AC-AC electronic ballast system in which the switching frequencies of both the PFC converter and the DC-AC inverter are significantly higher than the lamp current frequency, without degradation of lamp operating characteristics, to thereby facilitate significant reduction in the size and weight of the reactive elements, and thus, significant miniaturization of the ballast system. The present invention fulfills this need.

SUMMARY OF THE INVENTION

The present invention encompasses an AC-AC ballast system for a discharge lamp (e.g., a fluorescent lamp), which includes a PFC converter which incorporates an isolation transformer, and a DC-AC inverter provided on the secondary side of the isolation transformer. Because the AC line input is isolated from the lamp load by the transformer in the PFC converter, the switching frequency of the PFC converter can be advantageously significantly higher than the lamp current frequency (and the switching frequency of the DC-AC inverter), to thereby enable a signficant reduction in the size and weight of the PFC inductor, the isolation transformer, and other reactive elements of the ballast circuitry, relative to conventional ballast systems, without an increase in the emission of EMI radiation from the lamp. In this regard, the ballast system of the present invention can be thought of as a two-frequency ballast system having an isolated PFC converter.

In an exemplary embodiment of the ballast system of the present invention, the PFC converter includes a DC-DC converter, and a dither power factor correction circuit provided on the primary side of the isolation transformer, and the DC-AC inverter is a standard half-bridge or full-bridge DC-AC inverter. The PFC converter includes a first switching circuit and a first control circuit is provided for controlling the operation of the first switching circuit. In particular, the first control circuit operates the first switching circuit at a first switching frequency. The first control circuit also modulates the switching frequency of the first switching circuit in order to effect power factor correction. The first switching circuit preferably includes a pair of switches, and the first control circuit modulates the switching frequency of each switch. The DC-AC inverter includes a second switching circuit and a second control circuit is provided for controlling the operation of the second switching circuit. In particular, the second control circuit operates the second switching circuit at a second switching frequency which is much lower than the first switching frequency, e.g., at least ten times lower than the first switching frequency. The second control circuit modulates the frequency of the second switching circuit in order to regulate the sinusoidal lamp current. The second switching circuit preferably includes a pair of switches, and the second control circuit modulates the frequency of each switch.

Several alternative embodiments of the ballast system of the present invention are disclosed herein. A first alternative embodiment is the same as the exemplary embodiment described above, except that a half-bridge PFC converter is substituted for the dither PFC converter. A second alternative embodiment is the same as the exemplary embodiment described above, except that a push-pull PFC converter is substituted for the dither PFC converter. A third alternative embodiment is the same as the exemplary embodiment described above, except that a PWM DC-AC inverter is substituted for the standard half-bridge (or full-bridge) DC-AC inverter. With this embodiment, the second control circuit can operate the second switching circuit at a second switching frequency that is much higher (e.g., 5–10 times higher) than the first switching frequency, and modulate the duty ratio of the second switching circuit at a modulation frequency which is much lower than the first switching frequency, e.g., at the lamp current frequency.

BRIEF DESCRIPTION OF THE DRAWINGS

These and various other features and advantages of the present invention will be readily understood with reference to the following detailed description taken in conjunction with the accompanying drawings, in which.

DETAILED DESCRIPTION OF THE INVENTION

Figure 3:
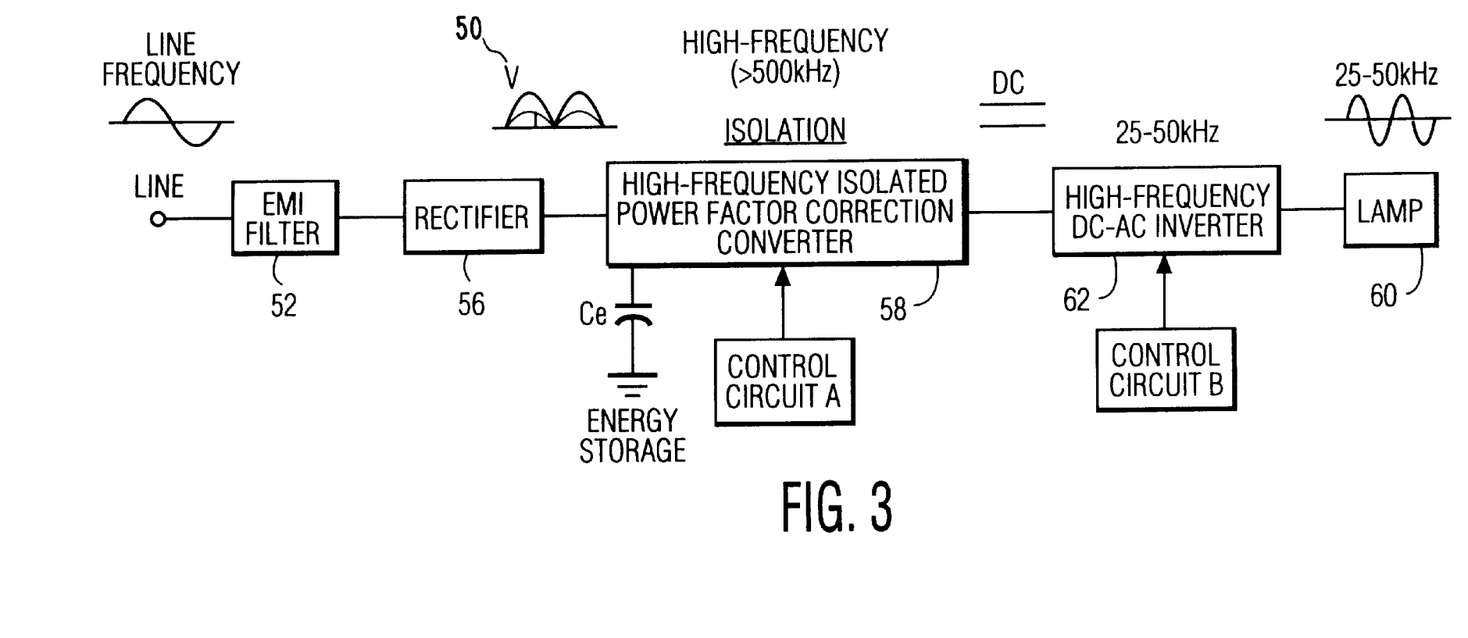
FIG. 3 is a block diagram of an electronic ballast system which constitutes a presently preferred embodiment of the present invention.

With reference now to FIG. 3, there can be seen a block diagram of an electronic ballast system 50 which constitutes a presently preferred embodiment of the present invention. As with the conventional ballast system described hereinabove, the ballast system 50 of the present invention includes an EMI filter 52 and a rectifier 56, e.g., a half-bridge or full-bridge rectifier. However, rather than the non-isolated boost converter of the conventional ballast system the ballast system 50 of the present invention includes a high-frequency PFC converter 58 which incorporates an isolation transformer (not shown in FIG. 3) which isolates the AC utility line and the lamp 60. An energy storage capacitor Ce is connected across the PFC converter 58 on the primary side of the isolation transformer. The output of the isolated PFC converter 58 is a DC voltage which is well-regulated by the control circuit A. This well-regulated DC voltage is then inverted into a high-frequency AC voltage by a high-frequency DC-AC inverter 62, e.g., a standard half-bridge or full-bridge AC-DC inverter or a half-bridge or full-bridge PWM AC-DC inverter. The high-frequency AC voltage produced by the DC-AC inverter 62 is delivered to the lamp 60 as a sinusoidal (AC) current for ignition thereof The control circuit B regulates the sinusoidal lamp current. The switching frequency of the PFC converter 58 is significantly higher than the switching frequency of the DC-AC inverter 62, which is the same as the lamp current frequency. In this connection, the switching frequency of the PFC converter 58 is preferably >500 kHz, whereas the switching frequency of the DC-AC inverter 62 and the lamp current frequency is preferably in the range of 25–50 kHz, in order to prevent excessive EMI radiation from the lamp 60, although the specific switching frequencies employed are not limiting to the present invention.

Figure 4:
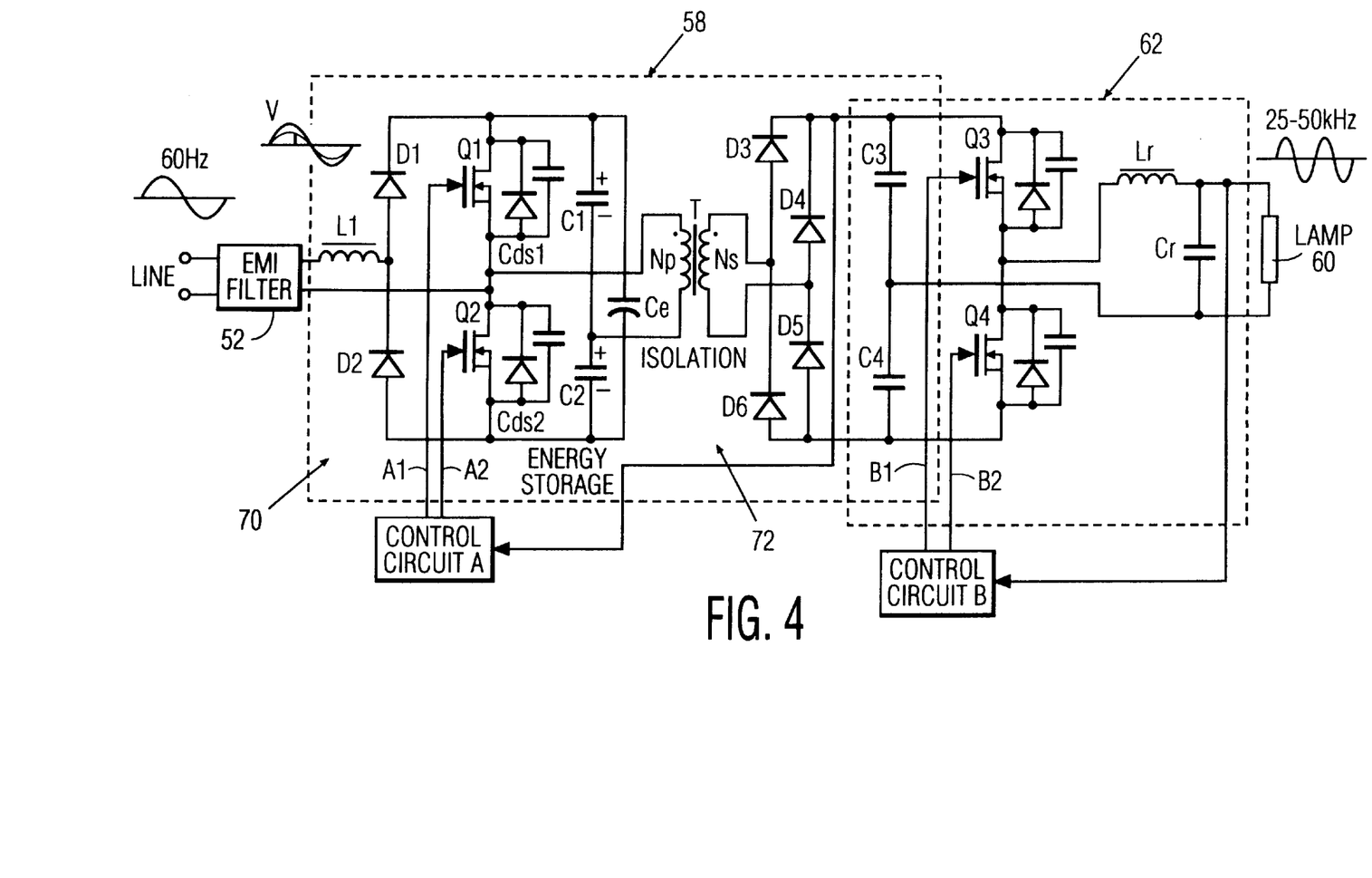
FIG. 4 is a partial schematic, partial block diagram of an exemplary implementation of the ballast system of the present invention depicted in FIG. 3.

With reference now to FIG. 4, there can be seen a partial schematic, partial block diagram of an exemplary implementation of the above-described presently preferred embodiment of the present invention. With this particular implementation, the PFC converter 58 is comprised of a dither power factor correction circuit 70 and a high-frequency DC-DC converter 72. The dither power factor correction circuit 70 includes an inductor L1, diodes D1 and D2, MOSFET switches Q1 and Q2, and energy storage capacitor Ce. The DC-DC converter 72 includes the MOSFET switches Q1 and Q2, capacitors C1 and C2, transformer T, a full-bridge rectifier comprised of the diodes D3–D6, and capacitors C3 and C4. The DC-AC inverter 62 is a half-bridge inverter comprised of the capacitors C3 and C4, MOSFET switches Q3 and Q4, and an L-C tank circuit comprised of an inductor Lr and a capacitor Cr connected across the lamp 60.

Figure 5A:
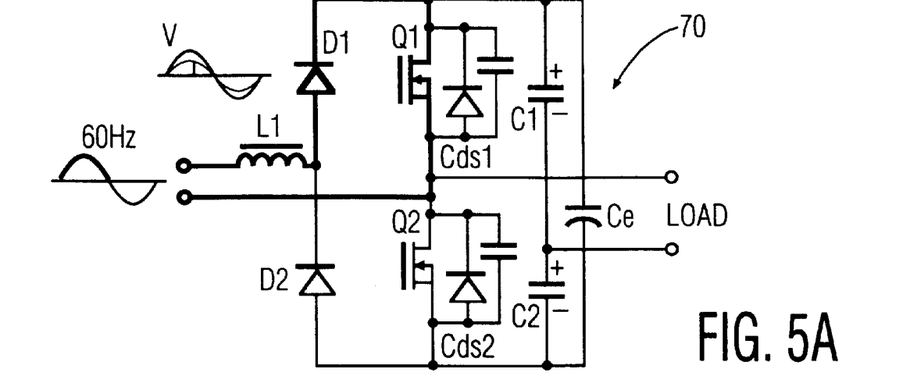
FIGS. 5A–5D are schematic diagrams which depict successive stages of the operation of the the dither power factor correction circuit of the ballast system of the present invention depicted in FIG. 4.

With reference now to FIGS. 5A–5D, the operation of the dither power factor correction circuit 70 will now be described. With particular reference first to FIG. 5A, when the line voltage Vi is positive and the switch Q1 is turned on, the line voltage Vi is applied to the inductor L1 through the diode D1 and the switch Q1. The current through L1 rises linearly from zero to a positive peak value, and the energy is stored by the inductor L1.

Figure 5B:
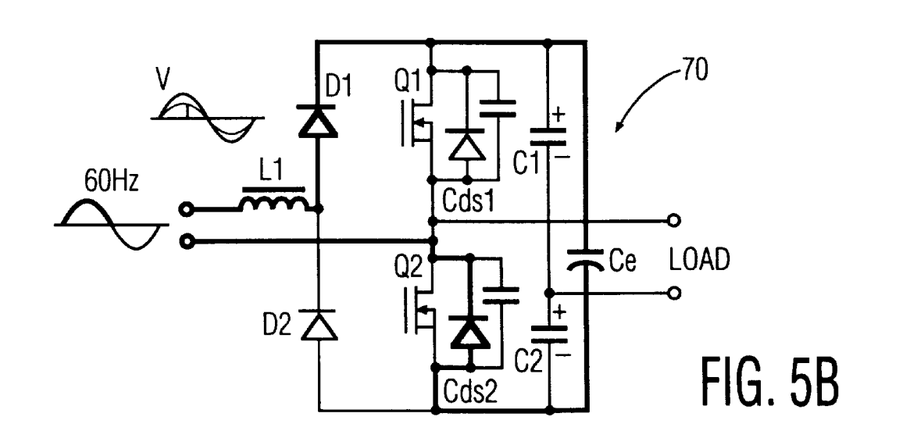

With particular reference now to FIG. 5B, when the line voltage V1 is positive and the switch Q1 is turned off, the positive inductor current flows to the energy storage capacitor Ce through the body diode of the switch Q2, to thereby transfer the energy stored in the inductor L1 when the switch Q1 is turned on, to the energy storage capacitor Ce. The current through the inductor L1 falls linearly from its positive peak value to zero.

Figure 5C:
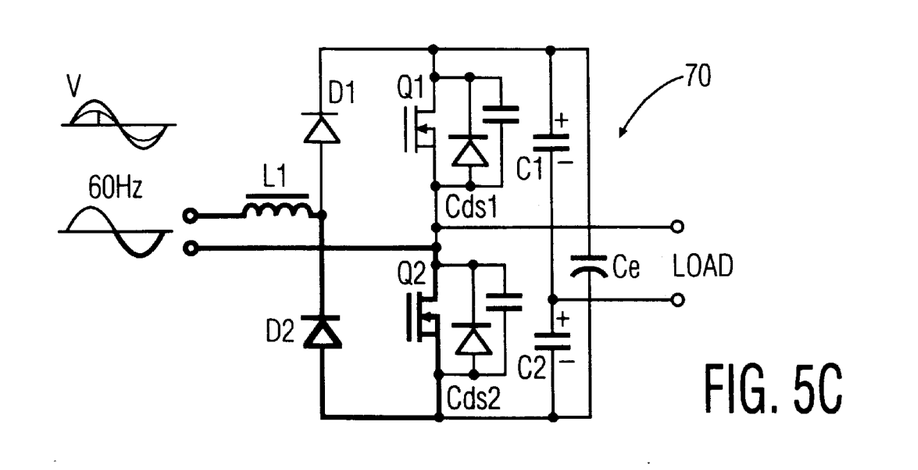

With particular reference now to FIG. 5C, when the line voltage V1 is negative and the switch Q2 is turned on, the line voltage V1 is applied to the inductor L1 through the diode D2 and the switch Q2. The current through L1 rises linearly from zero to a negative peak value, and the energy is stored by the inductor L1.

Figure 5D:
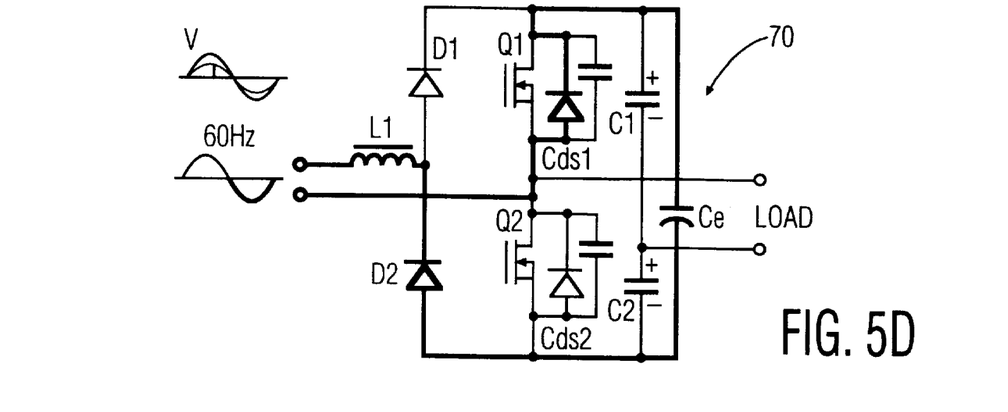

With particular reference to FIG. 5D, when the line voltage Vi is negative and the switch Q2 is turned off, the negative inductor current flows to the energy storage capacitor Ce through the body diode 78 of the switch Q1, to thereby transfer the energy stored in the inductor L1 when the switch Q2 is turned on, to the energy storage capacitor Ce. The current through the inductor L1 falls linearly from its negative peak value to zero.

With reference again to FIG. 4, the control circuit A receives a full-wave rectified feedback signal from the output of the DC-DC converter 72, and modulates the switching frequency of the switches Q1 and Q2 in such a manner as to effect power factor correction. The switches Q1 and Q2 are turned on and off in complementary fashion, with a nominal 50% duty ratio, at high frequency, e.g., >500 kHz, so that the current through the inductor L1 is in discontinuous conduction mode (DCM). After the high-frequency components of the current through the inductor L1 are filtered by the EMI filter 52, the line current is a semi-sinusoidal wave in phase with the line voltage. The power factor is close to unity and the total harmonic distortion is low. Thus, the input power is controlled by the frequency modulation of the MOSFET switches Q1 and Q2.

Figure 6:
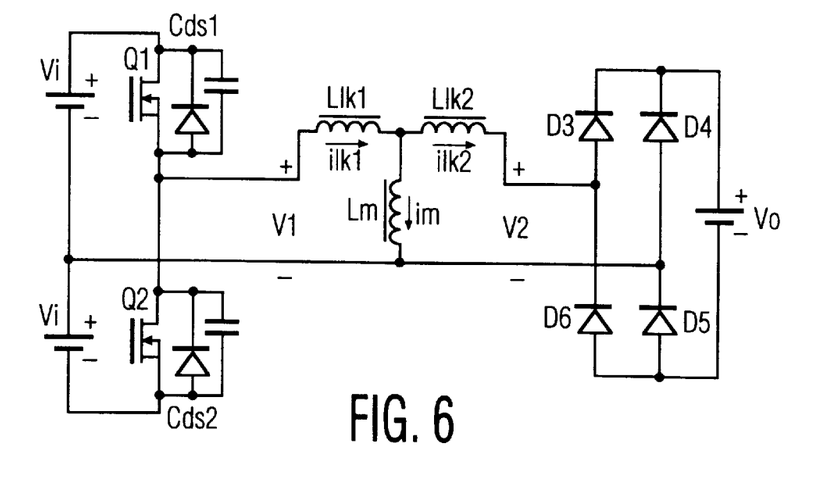
FIG. 6 is the equivalent circuit for the DC-DC converter of the ballast system of the present invention depicted in FIG. 4.
Figure 7:
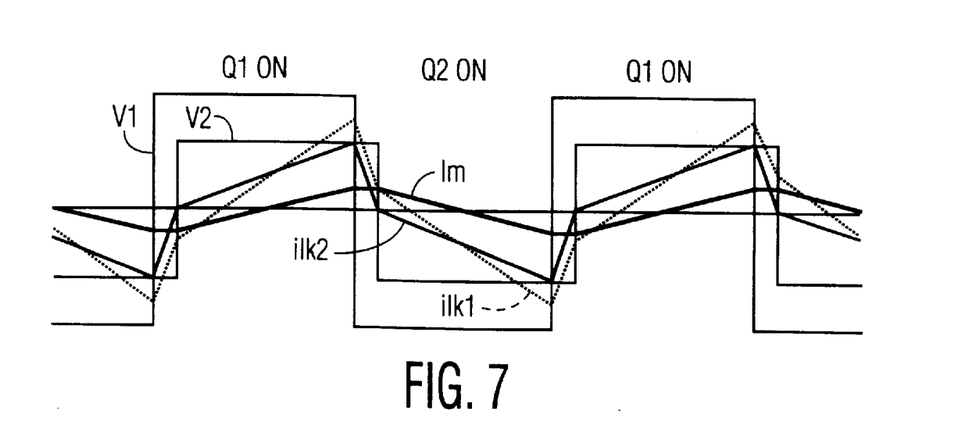
FIG. 7 is a diagram of the operating waveforms for the DC-DC converter of the ballast system of the preferred embodiment of the present invention depicted in FIG. 6.

With reference now to FIG. 6, there can be seen the equivalent circuit for the DC-DC converter 72, in which the secondary side is reflected to the primary side, and the output is replaced by a voltage source Vo. As can be seen, the transformer T has leakage inductances Llk1 and Llk2, and a magnetizing inductance Lm. Before the switch Q1 is turned on, the current ilk2 is negative. After the switch Q1 is turned on, a positive voltage V1 is applied to the primary side of the transformer T, but a negative voltage Vo is applied to the secondary side of the transformer T through the diodes D4 and D6. The current ilk1 flowing through Llk1 and the current im flowing through Lm rise up. When ilk1 exceeds im, the current ilk2 (=ilk1−im) through Llk2 becomes positive and flows through diodes D3 and D5. When the switch Q2 is turned on, the operation is similar, but in reverse. The operating waveforms are depicted in FIG. 7.

The DC-DC converter 72 can be designed to be operated with zero-voltage-switching in order to reduce switching losses and switching noise. In this connection, the duty ratio control signals A1, A2 applied by the control circuit A to the gates of the MOSFET switches Q1 and Q2, respectively, are held inactive during a dead time, so that both switches Q1 and Q2 are turned off during this dead time. During the dead time, the current ilk1 through the leakage inductance Llk1 is used to charge and discharge the drain-source capacitances Cds1 and Cds2 of the switches Q1 and Q2, respectively. If the energy stored in the leakage inductance Llk1 is not enough to effect complete charge and discharge of the drain-source capacitances Cds1 and Cds2, the energy stored in the magnetizing inductance continues to charge and discharge these capacitances. The DC-DC converter 72 can be designed for zero-voltage-switching over a full load and input voltage range.

With reference again to FIG. 4, the high-frequency half-bridge DC-AC inverter 62 is conveniently the same as that in the conventional ballast circuit, except that the isolation transformer is eliminated, due to its inclusion in the PFC converter 58. The control circuit B receives a lamp current feedback signal and, in response thereto, modulates the switching frequency of the switches Q3 and Q4, in such a manner as to regulate the sinusoidal lamp current to a nearly constant rms value. In the preferred embodiment, the switches Q3 and Q4 are turned on and off in complementary fashion, with a nominal 50% duty ratio, at a high frequency, e.g., 25–50 kHz. Thus, the output power is regulated by the frequency modulation of the switches Q3 and Q4.

If the resonant frequency of the L-C circuit (Lr, Cr) is lower than the switching frequency of the DC-AC inverter 62, the inverter 62 can also be designed to be operated with zero-voltage-switching in order to reduce switching losses and switching noise. In this connection, the duty ratio control signals B1, B2 applied by the control circuit B to the gates of the MOSFET switches Q3 and Q4, respectively, are held inactive during a specified dead time, so that both switches Q3 and Q4 are turned off during this dead time.

Figure 8:
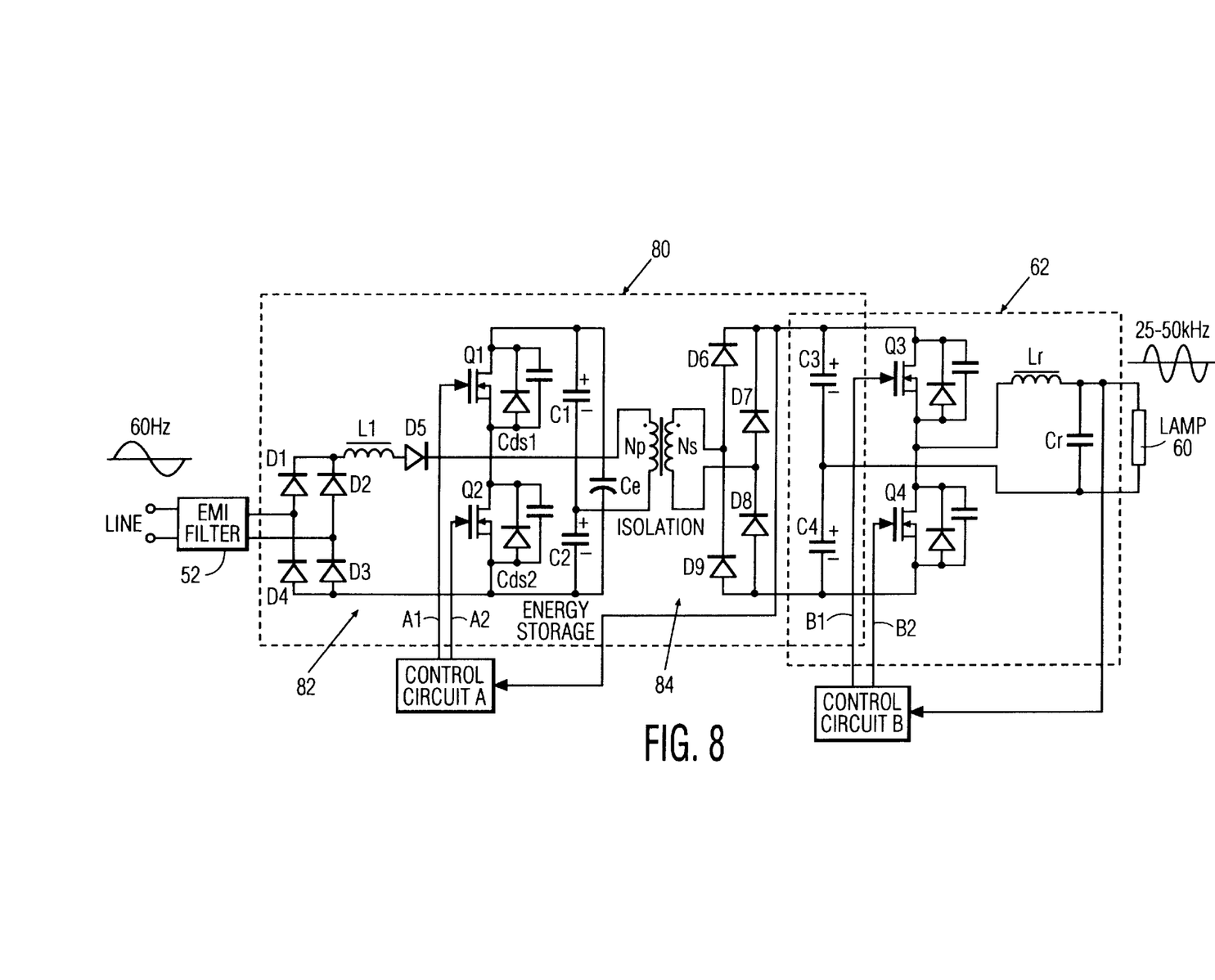
FIG. 8 is a partial schematic, partial block diagram of a first alternative embodiment of the ballast system of the present invention.

With reference now to FIG. 8, there can be seen a first alternative embodiment of the ballast system of the present invention, which is the same as the exemplary implementation of the presently preferred embodiment depicted in FIG. 4, except that a high-frequency half-bridge PFC converter 80 is substituted for the high-frequency dither PFC converter 58. The half-bridge PFC converter 80 is comprised of a half-bridge power factor correction circuit 82 and a DC-DC converter 84. The half-bridge power factor correction circuit 82 includes a full-bridge rectifier comprised of diodes D1–D4, an inductor L1 and diode D5, MOSFET switches Q1 and Q2, and energy storage capacitor Ce. The DC-DC converter 84 is comprised of the MOSFET switches Q1 and Q2, capacitors C1 and C2, transformer T, a full-bridge rectifier comprised of diodes D6–D9, and capacitors C3 and C4.

Figure 9:
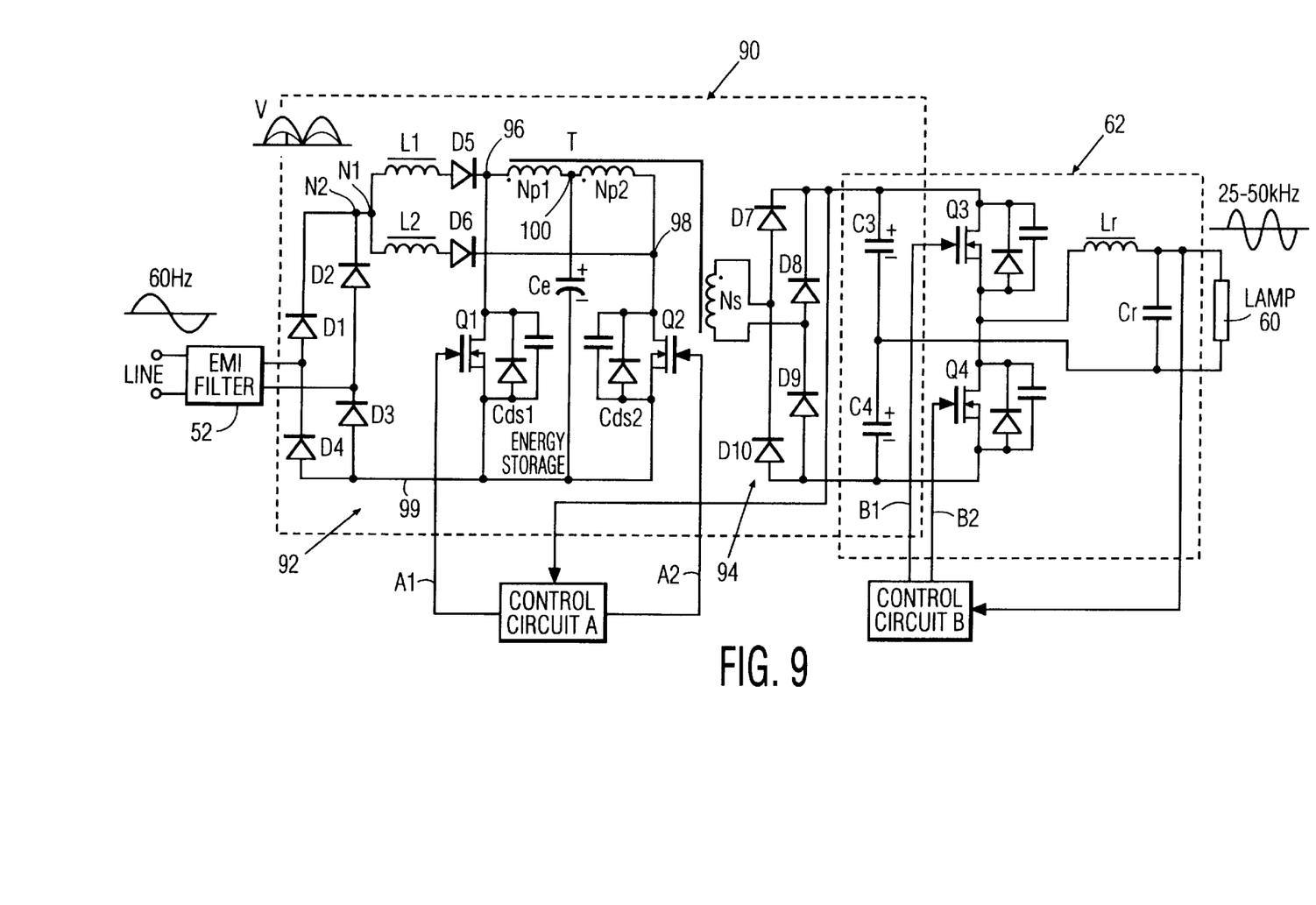
FIG. 9 is a partial schematic, partial block diagram of a second alternative embodiment of the ballast system of the present invention.

With reference now to FIG. 9, there can be seen a second alternative embodiment of the ballast system of the present invention, which is the same as the exemplary implementation of the presently preferred embodiment depicted in FIG. 4, except that a high-frequency push-pull PFC converter 90 is substituted for the high-frequency dither PFC converter 58. The push-pull PFC converter 90 is comprised of a push-pull power factor correction circuit 92 and a DC-DC converter 94. The push-pull power factor correction circuit 92 includes an inductor L1 and diode D5 connected in series between a node N1 and a first terminal 96 of the primary winding of the transformer T, and an inductor L2 and diode D6 connected in series between the node N1 and a second terminal 98 of the primary winding of the transformer T, in parallel with the inductor L1 and diode D5. The node N1 is coupled to the output junction node N2 of a full-bridge rectifier comprised of diodes D1–D4. A first MOSFET switch Q1 is connected between the first terminal 96 of the primary winding of the transformer T and bottom rail 99, and a second MOSFET switch Q2 is connected between the second terminal 98 of the primary winding of the transformer T and the bottom rail 99, in parallel with the first switch Q1. The energy storage capacitor Ce is connected between the center tap 100 of the transformer T and the bottom rail 99. The remaining elements of the ballast system of this embodiment are the same as the corresponding elements of the ballast system of the presently preferred embodiment described hereianbove, and thus, a description thereof will be omitted.

Figure 10:
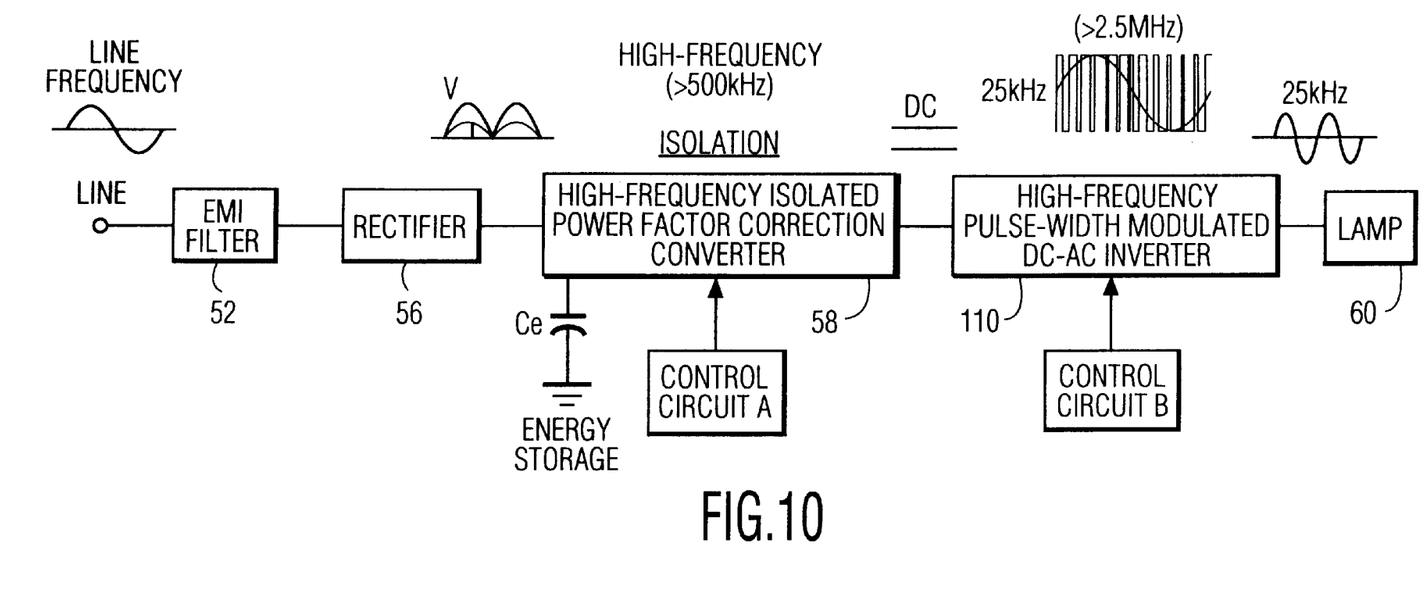
FIG. 10 is a block diagram of a third alternative embodiment of the ballast system of the present invention.
Figure 11:
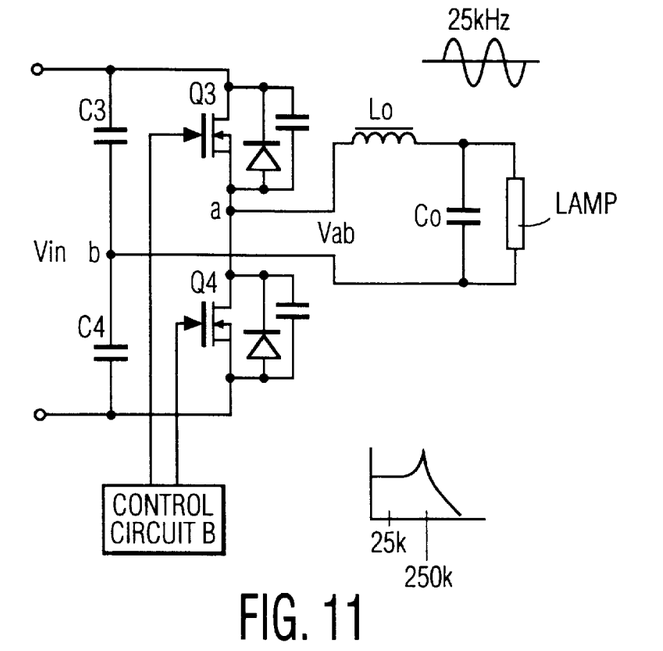
FIG. 11 is a partial schematic, partial block diagram of a first embodiment of the PWM DC-AC inverter of the ballast system of the third alternative embodiment of the present invention depicted in FIG. 10.
Figure 12:
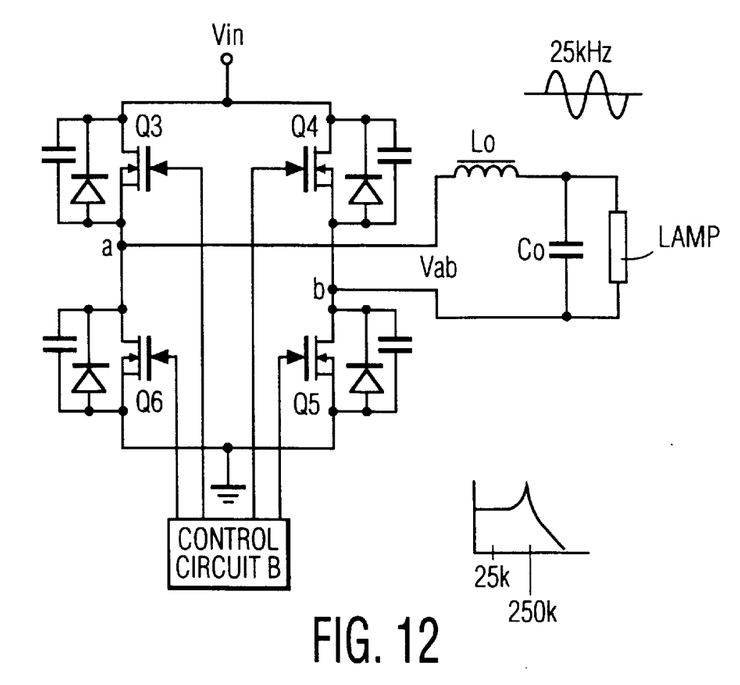
FIG. 12 is a partial schematic, partial block diagram of a second embodiment of the PWM DC-AC inverter of the ballast system of the third alternative embodiment of the present invention depicted in FIG. 10.
Figure 13:
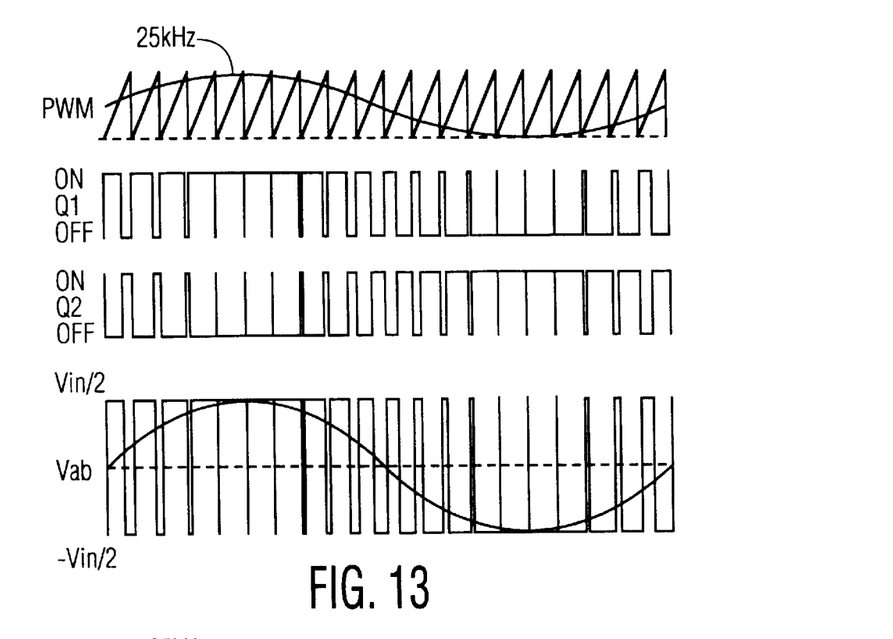
FIG. 13 is a diagram depicting the operating waveforms of the first embodiment of the PWM DC-AC inverter depicted in FIG. 11; and, FIG. 14 is a diagram depicting the operating waveforms of the second embodiment of the PWM DC-AC inverter depicted in FIG. 12.
Figure 14:
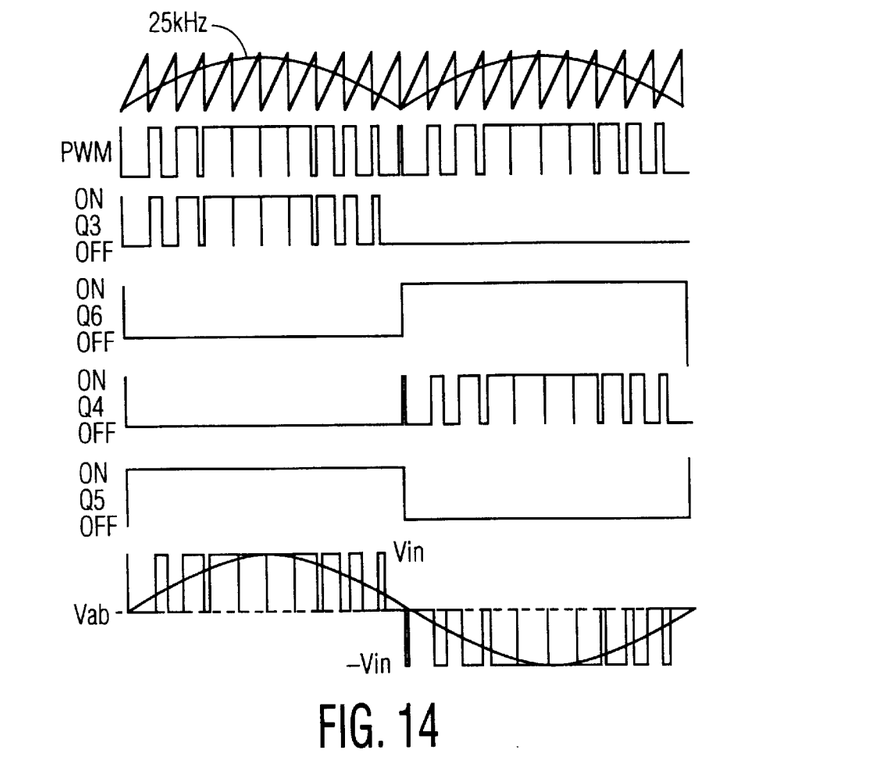

With reference now to FIG. 10, there can be seen a third alternative embodiment of the ballast system of the present invention, which is the same as the exemplary implementation of the presently preferred embodiment of the present invention depicted in FIG. 4, except that a high-frequency pulse-width modulated (PWM) DC-AC inverter 110 is substituted for the standard half-bridge DC-AC inverter 62. The PWM DC-AC inverter 110 may be a half-bridge PWM inverter as shown in FIG. 11, or a full-bridge PWM inverter as shown in FIG. 12. The half-bridge PWM inverter works in the following manner. The pulse width of the duty ratio control signals B1, B2 issued by the control circuit B are modulated by a relatively low-frequency signal (e.g., a 25–50 kHz signal), resulting in a pulse-width modulated voltage Vab across points a and b. This pulse-width modulated voltage Vab is filtered by the L-C circuit comprised of the inductor Lo and the capacitor Co, to thereby produce a regulated, relatively low frequency output voltage (e.g., 25–50 kHz AC voltage) for driving the lamp 60. The corner frequency of the L-C filter can be designed for operation at a frequency at least one decade higher than the modulation frequency, e.g., 250 kHz, thereby enabling the size of the L-C filter to be significantly reduced. The switching frequency of the PWM inverter 110 (i.e., the nominal frequency of the duty ratio control signals B1, B2) can be at least one decade higher than the corner frequency of the L-C filter, e.g., 2.5 MHz. During ignition of the lamp 60, the modulation frequency is on the same order as the corner frequency of the L-C filter so that a high-voltage output can be obtained to ignite the lamp 60, due to resonance of the L-C circuit. During steady-state operation of the lamp 60, the modulation frequency is kept to 25 kHz in order to prevent excessive EMI radiation from the lamp 60. Thus, the control circuit B regulates the lamp current by current mode control. The operating waveforms for the half-bridge PWM DC-AC inverter are depicted in FIG. 13, and the operating waveforms for the full-bridge PWM DC-AC inverter are depicted in FIG. 14.

Although a presently preferred and various alternative embodiments of the present invention have been described in detail hereinabove, it should be clearly understood that many variations and/or modifications of the basic inventive concepts herein taught which may appear to those skilled in the pertinent art will fall within the spirit and scope of the present invention as defined in the appended claims. In this connection, for a more detailed understanding of various elements and facets of the present invention, and permissible variations thereof, reference is made to the following references.

Namely, for a more detailed understanding of power factor correction converters and DC-DC converters, reference is made to:

D. Chambers and D. Wang, "Dynamic power factor correction in capacitor input off line converters", *POWERCON '79 Proceedings*, pp. B3-1–B3-6, May, 1979;

C. Zhou and M. M. Jovanovic, "Design trade-offs in continous current-mode controlled boost power factor correction circuits", *High Frequency Power Conversion Conference Record '92*, pp. 202–220, May, 1992, C. Solva, "Power factor correction with UC3854", *Application Note, Unitrode Integrated Circuit,*

C. Zhou, "Design and analysis of an active power factor correction circuit", M. S. Thesis, Virginia Polytechnique Institute and State University, Blacksburg, Va., May 1990;

C. P. Henze, "A digitally controlled AC to AC power conditioner that draws sinusoidal input current", *IEEE PESC '86 Record*, June 1986;

R. Erickson, M. Madigan and S. Singer, "Design of a simple high power factor rectifier based on the flyback converter", *IEEE APEC '90 Proceedings*, pp. 792–801, February 1990;

W. Tang, Y. Jiang, G. C. Hua and F. C. Lee, "Power factor correction with flyback converter employing charge control", *VPEC Seminar '92 Proceeding*, Virginia Polytechnique Institute and State University, Blacksburg, Va., September 1992;

M. H. Kheraluwala, R. L. Steigerwald and R. Gurumoorthy, "A fast response high power factor converter with a single power stage", *IEEE PESC '91 Record*, pp. 769–779, June 1991;

M. Madigan, R. Erickson and E. Ismail, "Integrated high quality rectifier-regulator", *IEEE PESC '92*, pp. 1043–1051, June 1992;

I. Takahashi and R. Y. Igarashi, "A swtiching power supply of 99% power factor by dither rectifier", *IEEE INTELEC '91 Proceedings*, pp. 714–719, November 1991;

Y. Jiang, G. C. Hua, W. Tang and F. C. Lee, "A novel single-phase power factor correction scheme", *VPEC Seminar '92 Proceedings*, Virginia Polytechnique Institute and State University, Blacksburg, Va., September 1992; and, B. A. Miwa, D. M. Otten and M. F. Schlect, "High-efficiency power factor converter using interleaving techniques", *IEEE APEC '92 Proceedings*, pp. 557–568, February 1992.

For a more detailed understanding of zero-voltage-switching and soft-switching converters, including PWM DC-AC converters/inverters, reference is made to:

C. P. Henze, H. C. Martin and D. W. Parley, "Zero-voltage-switching in high-frequency power converters using pulse width modulation", *Proceedings of 1988 IEEE Applied Power Electronics Conference*, pp. 33–40, February 1988;

R. W. Erickson, A. F. Hernandez, A. F. Witulski and R. Xu, "A nonlinear resonant switch", *Record of 1989 IEEE Power Electronics Specialists Conference*, pp. 43–50, June 1989;

V. Vorperian, "Quasi-square-wave converters: topologies and analysis", *IEEE, Transactions on Power Electronics*, Vol. 3, No. 2, pp. 183–191, April 1988;

K. Watanabe, S. Takeishi, I. Norigoe and R. Hiramatsu, "Self running converter utilizing partial resonance", *Proceeding of 1988 IEEE International Telecommunication Energy Conference*, pp. 186–193, October 1988;

K. Harada and H. Sakamoto, "Non-resonant converter for mega hertz switching", *Record of 1989 IEEE Power Electronics Specialists Conference*, pp. 889–894, June 1989;

K. Harada and H. Sakamoto, "Switched-snubber for high-frequency switching", *Record of 1990 IEEE Power Electronics Specialists Conference*, pp. 181–188, June 1990;

K. Harada and H. Sakamoto, "On the saturable inductor commutation for zero-voltage-switching", *Record of 1989 IEEE Power Electronics Specialists Conference*, pp. 189–196, June 1990;

G. C. Hua, F. C. Lee and M. M. Jovanovic, "An improved zero-voltage-switched PWM converter using a saturable inductor", *Record of 1989 IEEE Power Electronics Specialists Conference*, pp. 189–194, June 1991;

W. J. Gu and K. Harada, "Novel self-excited PWM converters with zero-voltage-switched resonant transition using a saturable core", *Proceedings of 1992 IEEE Applied Power Electronics Conference*, pp. 58–65, February 1992;

W. J. Gu and K. Harada, "A novel, self-excited, PWM forward converter with ZVS resonant transition using two minor-loop-operated saturable cores", *Record of 1992 IEEE Power Electronics Specialists Conference*, pp. 85–92, June 1992;

G. C. Hua, C. S. Leu and F. C. Lee, "Novel zero-voltage-transition PWM converters", *Record of 1992 IEEE Power Electronics Specialists Conference*, pp. 55–61, June 1992;

U.S. Pat. No. 3,517,300, issued to W. McMurray, Jun. 23, 1970; and,

K. Harada, H. Sakamoto, and M. Shoyama, "Phase-controlled DC-AC converter", *IEEE Transactions on Power Electronics*, Vol. 3, No. 4, pp. 406–411, October 1988.

For a more detailed understanding of ballast systems, in general, reference is made to:

B. M. Wolfframm, "Ballasts-past, present, and future", *Record of the 1984 IEEE Industry Application Society Annual Meeting*, pp. 1288–1292, 1984;

R. J. Haver, "Electronic Ballasts", *PCIM Magazine*, pp. 52–56, April 1986;

R. Verderber, O. Morse and F. M. Rubinstein, "Performance of electronic ballast and controls with 34- and 40-Watt F40 fluorescent lamps", *IEEE Transactions on Industry Applications*, Vol. 25, No. 6, pp. 1049–1059, December 1989;

European Patent Application Publication Number 0507399A2, issued to Blom et al., and assigned to N. V. Philips;

U.S. Pat. No. 4,958,108, issued to Jorgensen, and assigned to Avtech Corporation;

U.S. Pat. No. 4,870,327, issued to Jorgensen, and assigned to Avtech Corporation; and, U.S. Pat. No. 4,412,156, issued to Ota, and assigned to Elmo Company.

What is claimed is:

1. A ballast system for a lamp, comprising:

rectifier means for rectifying AC input power having a first frequency and producing a pulsating DC current;

a DC-DC converter for converting said pulsating DC current into a substantially constant DC voltage, said DC-DC converter including an isolation transformer having a primary side and a secondary side and a power factor correction circuit provided on said primary side of said isolation transformer, said power factor correction circuit including an inductor and an energy storage capacitor;

second converter means provided on said secondary side of said isolation transformer for converting said constant DC voltage into an AC output current having a second frequency, said second frequency being higher than said first frequency; and power application means responsive to said AC output current for powering the lamp;

wherein said power factor correction circuit and said DC-DC converter include, in common, a first switching means for regulating conduction of current through said inductor and transfer of energy stored in said inductor to said energy storage capacitor, and first control means for operating said first switching means at a first switching frequency, and for modulating the switching frequency of said first switching means to effect power factor correction.

2. The ballast system as set forth in claim 1, wherein said power application means includes an L-C circuit having a resonant frequency, said L-C circuit producing a sinusoidal lamp current for powering the lamp.

3. The ballast system as set forth in claim 2, wherein said resonant frequency is substantially equal to said second frequency.

4. The ballast system as set forth in claim 2, wherein said second converter means includes second switching means and second control means for operating said second switching means at a second switching frequency.

5. The ballast system as set forth in claim 4, wherein said first switching frequency is higher than said second switching frequency.

6. The ballast system as set forth in claim 5, wherein said second switching frequency is substantially the same as said second frequency.

7. The ballast system as set forth in claim 5, wherein said first switching frequency is at least ten times higher than said second switching frequency.

8. The ballast system as set forth in claim 5, wherein said power factor correction circuit comprises a dither power factor correction circuit.

9. The ballast system as set forth in claim 4, wherein said second converter means comprises a half-bridge DC-AC inverter.

10. The ballast system as set forth in claim 4, wherein said second converter means comprises a full-bridge DC-AC inverter.

11. The ballast system as set forth in claim 4, wherein:

said second converter means comprises a PWM DC-AC inverter;

said second switching frequency is higher than said first switching frequency; and, said second control means modulates the duty ratio of said second switching means at a modulation frequency which is lower than said first switching frequency.

12. The ballast system as set forth in claim 4, wherein said second control means is responsive to a lamp current feedback signal for modulating the switching frequency of said second switching means, to thereby regulate said lamp current.

13. The ballast system as set forth in claim 12, wherein said first and second switching means are adapted for zero-voltage-switching.

14. The ballast system as set forth in claim 1, wherein said second converter means includes second switching means and second control means for operating said second switching means at a second switching frequency, said first switching frequency being higher than said second switching frequency.

15. The ballast system as set forth in claim 14, wherein said second switching frequency is substantially the same as said second frequency.

16. The ballast system as set forth in claim 15, wherein said first switching frequency is at least ten times higher than said second switching frequency.

* * * * *